United States Patent [19]

Ciancio

[11] Patent Number: 5,449,138

[45] Date of Patent: Sep. 12, 1995

[54] CONVERTIBLE BOOM STAND

[76] Inventor: Joseph Ciancio, 1284 Danforth Rd., Toronto, Ontario, Canada, M1J 1E9

[21] Appl. No.: 172,143

[22] Filed: Dec. 23, 1993

[51] Int. Cl.⁶ .............................................. F16M 13/00
[52] U.S. Cl. .................... 248/123.2; 248/538; 248/125.9; 403/110; 403/53; 403/61
[58] Field of Search ............... 248/123.1, 124, 185, 248/171, 292.1, 514, 538; 403/110, 84, 53, 55, 59, 61

[56] References Cited

U.S. PATENT DOCUMENTS

| | | |
|---|---|---|
| 1,282,676 | 10/1918 | Carlin . |
| 1,430,827 | 10/1922 | Moeckel . |
| 1,887,637 | 11/1932 | Hansen . |
| 1,942,925 | 1/1934 | Jenkins . |
| 1,971,757 | 8/1934 | Nerem . |
| 2,031,097 | 2/1936 | Bucky . |
| 2,453,967 | 11/1948 | Browne . |
| 2,479,720 | 8/1949 | Brandt ........................ 248/123.1 |
| 3,783,262 | 1/1974 | Pile .............................. 248/123.1 X |
| 4,047,684 | 9/1977 | Kobayashi . |
| 4,919,368 | 4/1990 | Garrett . |
| 5,058,842 | 10/1991 | Zemlin et al. ............... 248/185 X |
| 5,320,322 | 6/1994 | Williams ...................... 248/291 X |

OTHER PUBLICATIONS

Manfrotto Catalogue.

*Primary Examiner*—Karen J. Chotkowski
*Attorney, Agent, or Firm*—Dowell & Dowell

[57] ABSTRACT

The present invention is convertible boom stands useful for supporting lights, microphones and the like in a range of angles from the vertical. The stand can convert from a vertical stand which can support objects above the floor between a range of heights, to a boom stand which can also support the objects between a range of angles from the vertical. The convertible stand comprises a tubular member having an end portion with an opening and a longitudinal axis, legs mounted to the tubular member for supporting the tubular member in a substantially vertical orientation, an elongated arm configured to fit within the tubular member, the opening at the end of the tubular member being dimensioned to permit the arm to enter and exit the tubular member, a tilt mechanism for connecting the arm to the tubular member comprising a clevis attached adjacent the open end of the tubular member and a collar pivotally attached to the clevis, the collar having a central opening for retaining the arm therein, the collar pivotally movable between a vertical position wherein the opining of the collar and the opening of the tubular member are aligned and the arm can pass into and out of the tubular member and a tilted position wherein the arm is at an angle from the axis of the tubular member, the clevis having a lock for releasably locking the collar relative to the clevis, and the collar having a lock for releasably locking the arm in the collar, the clevis having a sloping concave face on a portion thereof adjacent the opening of the tubular member, the sloping face positioned and configured to receive the arm and position the arm adjacent the tubular member when the collar is in its tilted position.

15 Claims, 4 Drawing Sheets

CONVERTIBLE BOOM STAND

FIELD OF THE INVENTION

The present invention relates to convertible boom stands useful for supporting lights, microphones and the like in a range of angles from the vertical.

BACKGROUND OF THE INVENTION

In the photography industry, lighting is critical to the setting up of photographic shots. Often, light sources have to be positioned above the subject being photographed. In some cases, the light source must also be positioned at a specific angle from the vertical in order for the light to strike the subject at the appropriate angle. The positioning of the light source has traditionally been accomplished using a boom stand. Usually these boom stands include a telescoping boom arm mounted onto a central column with the central column being held in a substantially vertical position by supporting legs. The stand is usually provided with a mechanism for allowing the boom arm to pivot relative to the column, and to be locked into position when the boom arm is at the desired angle with respect to the column. The light source is attached to the end of the telescoping boom arm and its height above the floor is adjusted by adjusting the angle of the boom relative to the column.

Traditional boom stands are bulky devices which are usually difficult to assemble. A few stands are collapsible and permit the boom arm to fit within the column when the device is not in use. U.S. Pat. No. 4,047,684 to Kobayashi discloses a stand useful for supporting musical instruments such as symbols and includes a hollow centre post having collapsible legs attached thereto, a stem (boom arm) pivotally attached to the centre post by a tilter block assembly, and a lock mechanism for locking the stem in place. The device is only adequate for supporting smaller items such as symbols. U.S. Pat. No. 2,031,097 to Bucky discloses a collapsible stand having a hollow central column with attached folding legs, a boom arm pivotally attached to the central column by a tilter mechanism, and a means for locking the boom into place. The tilter mechanism is a key feature of the device because it permits the device to support heavy items such as large lights or cameras.

All of the existing stands are adequate for their intended uses, but there is a need for a stand which can position the boom at a wide variety of angles relative to the column. Existing stands, such as those disclosed by Bucky and Kobayashi, all make use of a tilting mechanism which allows the boom arm to pivot about the column at only one specific point. Furthermore, the tilting mechanisms disclosed by the prior art do not permit the boom arm to be positioned at small angles relative to the column.

SUMMARY OF THE INVENTION

The present invention is a stand comprising a tubular member having an end portion with an open end and a longitudinal axis, legs mounted to the tubular member for supporting the tubular member in a substantially vertical orientation, an elongated arm configured to fit within the tubular member, the opening at the end of the tubular member being dimensioned to permit the arm to enter and exit the tubular member, a tilt mechanism for connecting the arm to the tubular member comprising a clevis attached adjacent the open end of the tubular member and a collar pivotally attached to the clevis, the collar having a central opening for retaining the arm therein, the collar pivotally movable between a vertical position wherein the opining of the collar and the opening of the tubular member are aligned and the arm can pass into and out of the tubular member and a tilted position wherein the arm is at an angle from the axis of the tubular member, the clevis having a lock for releasably locking the collar relative to the clevis, and the collar having a lock for releasably locking the arm in the collar, the clevis having a sloping concave face on a portion thereof adjacent the opening of the tubular member, the sloping face positioned and configured to receive the arm and position the arm adjacent the tubular member when the collar is in its tilted position.

BRIEF DESCRIPTION OF THE FIGURES

Further features and advantages of the boom stand embodying the present invention will now be described and made clearer from the ensuing description, reference being had to the accompanying drawings, in which.

DETAILED DESCRIPTION OF THE INVENTION

Figure 1:
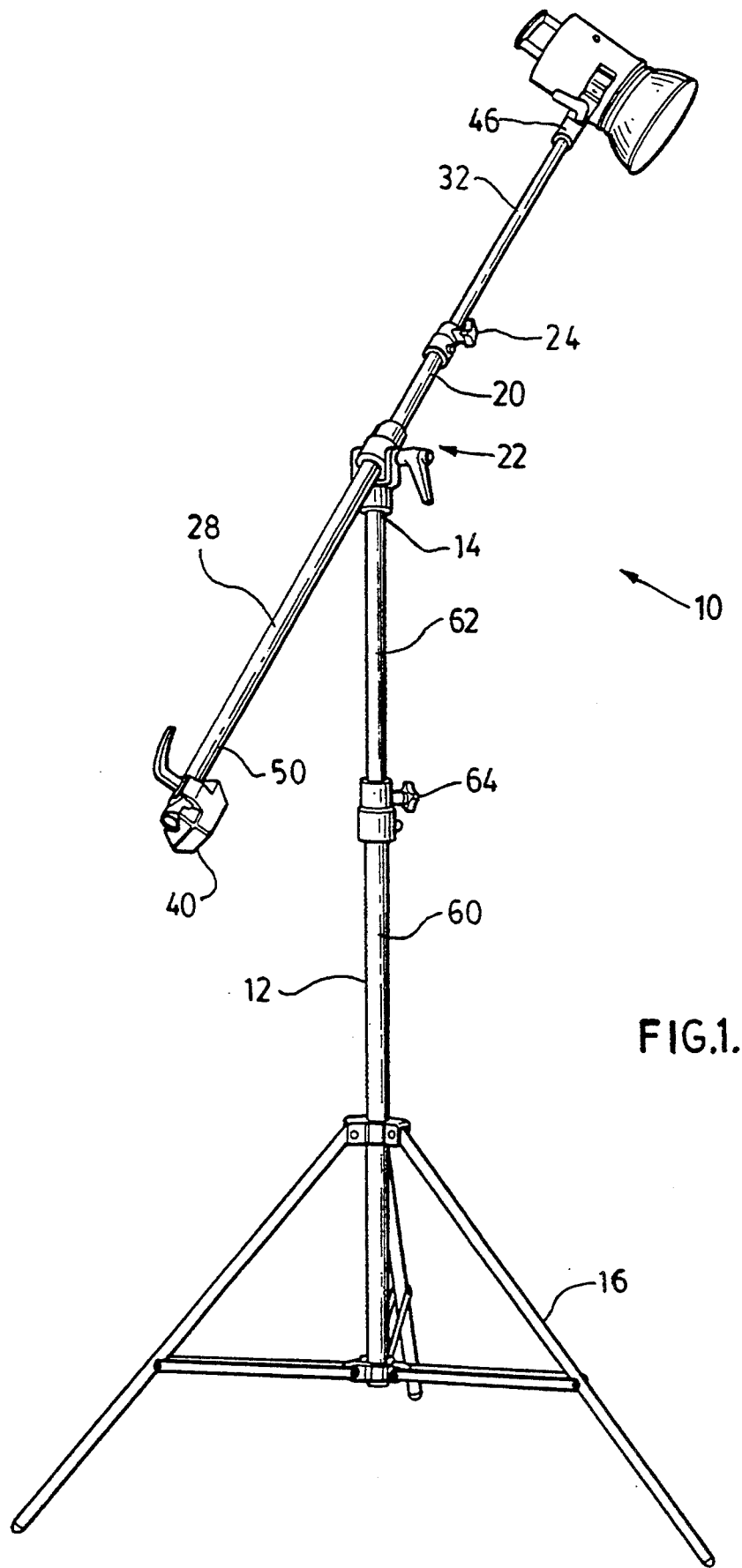
FIG. 1 is a vertical perspective view of the boom stand showing the boom arm in a position between its vertical and its tilted position.

Referring firstly to FIG. 1, a boom stand embodying the present invention is shown generally at 10 and comprises column 12, legs 16 attached to column 12, arm 20, and a tilt mechanism 22 coupling arm 20 and column 12. Column 12 and arm 20 are hollow tubes. The outside diameter of arm 20 is less than the inside diameter of column 12 to allow arm 20 to slide in and out of column 12.

Legs 16 support column 12 in a substantially vertical orientation. Legs 16 are preferably folding legs of the type generally used in the art. When not in use, legs 16 can be folded up so that they rest against column 12. Arm 20 can be formed from a single tube, but preferably arm 20 comprises at least two hollow tubes 28 and 32, as shown in FIG. 1. The outside diameter of tube 32 is less than the inside diameter of tube 28 so that tube 32 may be telescoped in or out of tube 28. Tube 28 is provided with clamp 24 at one end thereof to lock tube 32 into the desired position. When clamp 24 is disengaged, tube 32 may be moved relative to tube 28. The end portion of tube 32 is provided with a mounting bracket 46. Mounting bracket 46 is a standard mounting bracket which will allow for the mounting of studio lights or the like to the end of tube 32. The other end portion 50 of tube 28 may be provided with a detachable counter weight 40 which may be clamped onto end 50 to counter balance the device mounted to mounting bracket 46 of tube 32.

Column 12 may comprise a single hollow tube, but preferably it comprises two tubes 60 and 62 as shown in FIG. 1. The inside diameter of tube 60 is greater than the outside diameter of tube 62 so that tube 62 may be positioned partly within tube 60 and can telescope in and out of tube 60. Tube 60 is provided with a clamp 64 at the upper end thereof to lock tube 62 in position relative to tube 60 when the clamp is engaged. When clamp 64 is released, tube 62 may be moved relative to tube 60. Tilting mechanism 22 is attached to the upper end 14 of tube 62. By lowering or raising tube 62 with respect to tube 60, arm 20 may be lowered or raised respectively.

Figure 2:
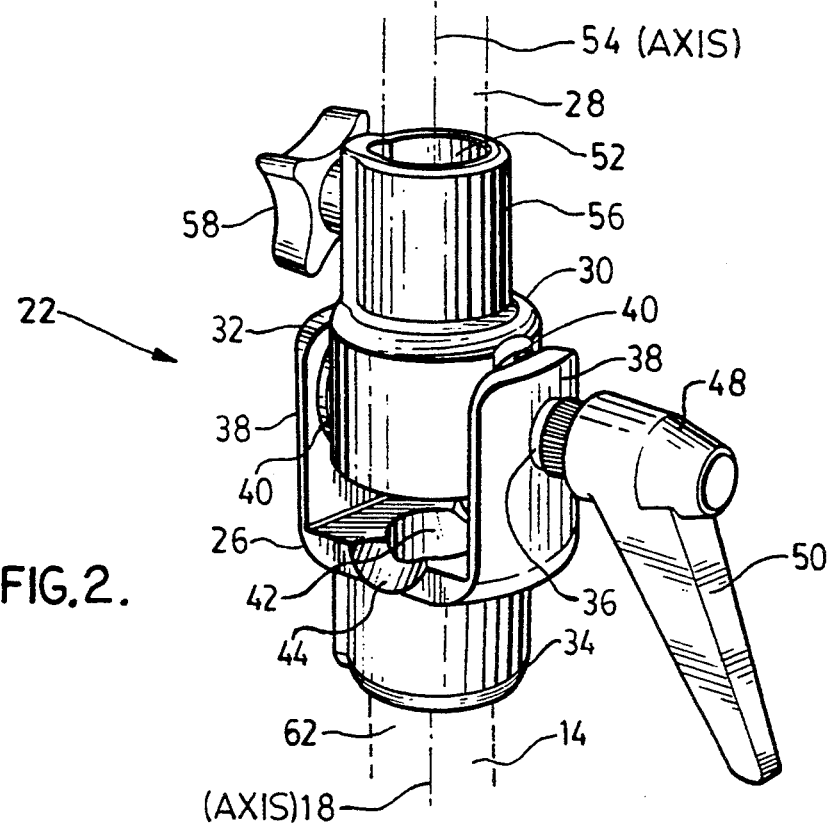
FIG. 2 is a perspective view of a portion of the boom stand showing the boom arm in its vertical position.
Figure 3:
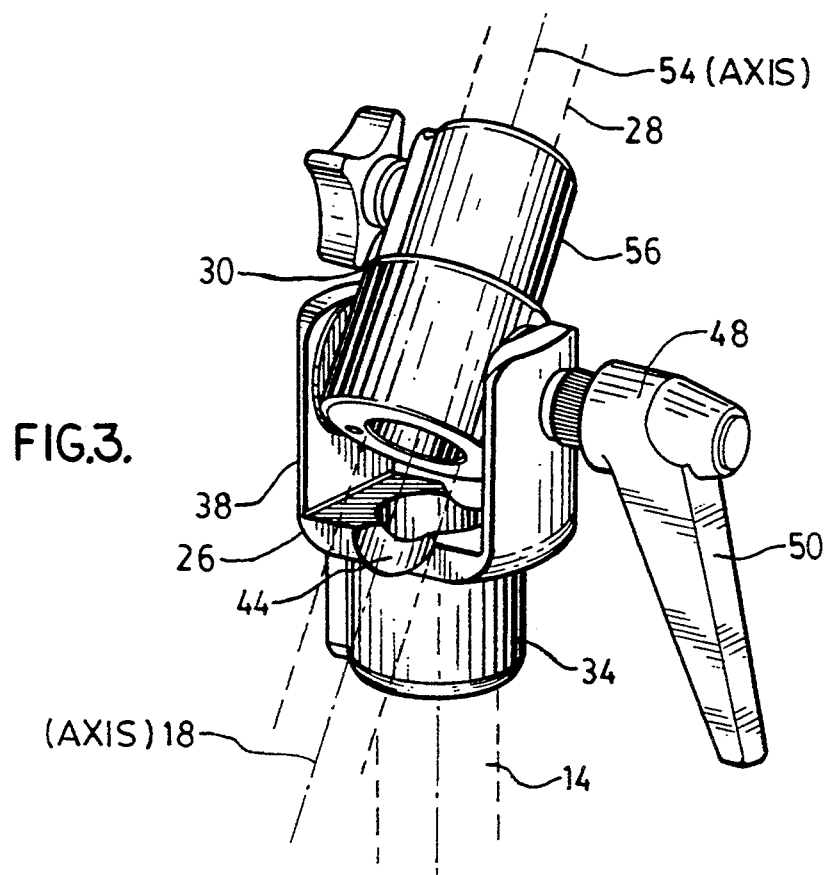
FIG. 3 is a perspective view similar to FIG. 2 showing the boom arm in its tilted position.
Figure 4:
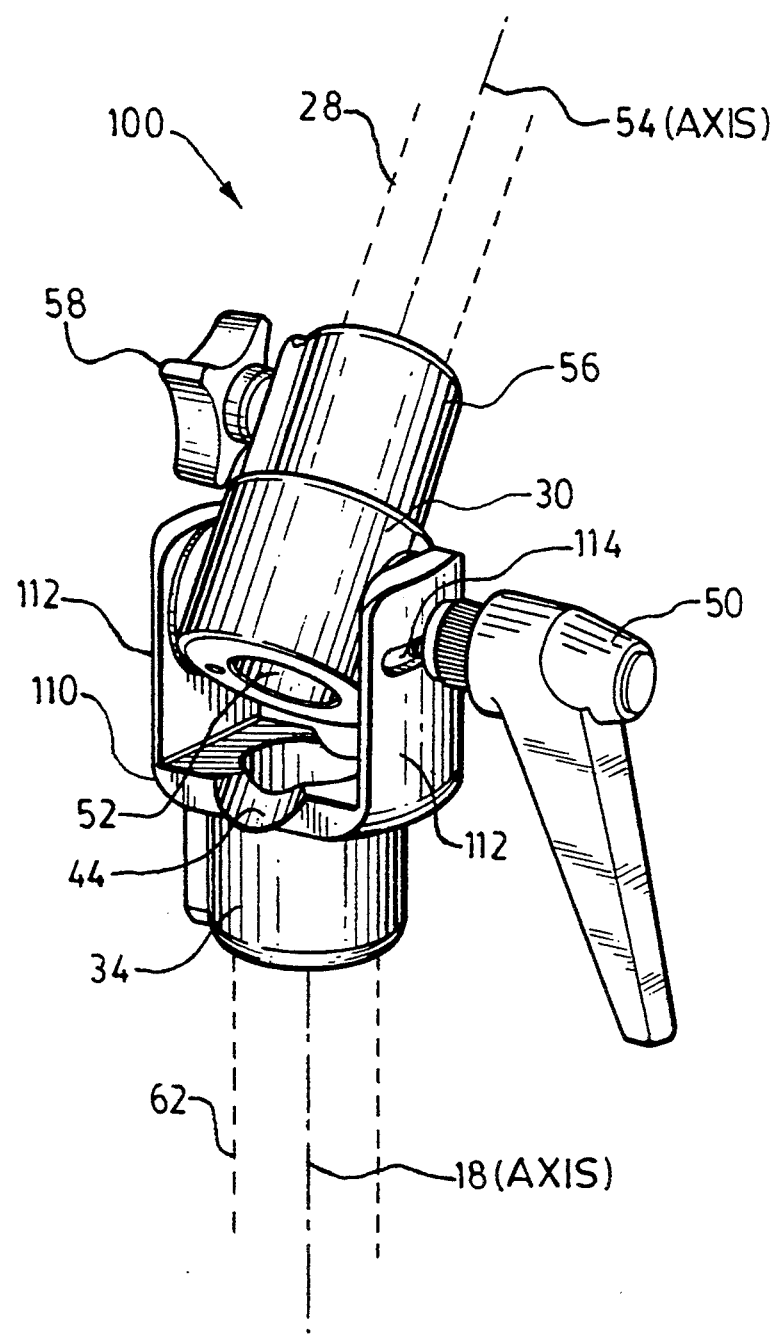
FIG. 4 is a perspective view of a portion of a second embodiment of the invention with the boom arm in its tilted position.

As can be seen from FIGS. 2 and 3, tilt mechanism 22 comprises a clevis 26 and a collar 30 pivotally attached to the clevis. Clevis 26 has a bottom tubular portion 34 having an opening 42 configured to allow tube 28 of arm 20 to pass snugly therethrough. Bottom tubular portion 34 is attached to the top portion 14 of tube 62 of column 12. Clevis 26 includes brackets 38 which extend from bottom tubular portion 34 and are substantially parallel to axis 18 of column 12. Bottom tubular portion 34 is provided with sloping concave face 44 which is at an angle to axis 18 of column 12. Sloping face 44 is a cut out of the peripheral edge of bottom portion 34. Collar 30 comprises a cylindrical sleeve 56 which has an opening 52 having an inside diameter slightly greater than the outside diameter of tube 28 of arm 20. Sleeve 56 is provided with a clamp 58 for locking tube 28 in position relative to the sleeve. Collar 30 is pivotally attached to brackets 38 at points 36, and is pivotally movable relative to clevis 26 between a vertical position as shown in FIG. 2 wherein openings 52 and 42 are aligned and tube 28 can pass through sleeve 56 and through tube 62 of column 12, and a tilted position as shown in FIG. 3 wherein axis 54 of collar 30 is at an angle from axis 18 of column 12. When collar 30 is in its tilted position, tube 28 is in contact with sloping face 44 of clevis 26. Sloping face 44 is concave to accept the curved surface of tube 28. The presence of sloping face 44 permits a smaller angle between axis 54 of collar 30 and axis 18 of column 12 when the collar is in its tilted position.

Tilt mechanism 22 also comprises locking mechanisms 48 and 58. Locking mechanism 48 includes a handle or lever 50 which can be tightened or loosened. When engaged by tightening handle 50, lock mechanism 48 holds collar 30 at a fixed angle relative to clevis 26. Between brackets 38 and collar 30 is a washer 40 which helps to decrease the friction between the brackets and the collar when the collar is moved relative to clevis 26. Locking mechanism 48 comprises handle 50 and a threaded rod (not shown) which is rigidly connected to collar 30. One end of the threaded rod passes through an aperture in bracket 38 and washer 40. Handle 50 is threaded onto the other end of the threaded rod. When handle 50 is turned clockwise, the handle is pressed against bracket 38 which in turn causes the bracket to press against collar 30. When handle 50 is turned clockwise a sufficient number of turns, the force pressing bracket 38 and collar 30 together is sufficiently great to lock collar 30 in place. When handle 50 is turned counter clockwise, the force pressing bracket 38 and collar 30 together decreases sufficiently to allow the collar to pivot. When lock mechanism 48 is released, collar 30 is free to pivot relative to clevis 26. It will be obvious to those skilled in the art that a variety of other locking mechanisms may be used.

When collar 30 is in its vertical position, tube 28 may be passed directly through both the collar, clevis 26 and tube 62; therefore, tube 28 may be telescoped out of or into column 12. When the collar is in its vertical position, tube 28 may be fully drawn into column 12 for storage. Alternatively, tube 28 may be raised out of tube 62 and locked into place by locking mechanism 58; in this orientation, the stand may operate as a traditional vertical stand, and a device may be mounted onto bracket 46.

Stand 10 may be converted from a vertical stand as shown in FIG. 2 into a boom stand as shown in FIG. 3 by releasing lock mechanism 58, completely withdrawing tube 28 out of column 12, releasing lock mechanism 48, pivoting collar 30 into the desired position, engaging lock mechanism 48 to lock collar 30 into place, passing tube 28 back through collar 30 and then engaging lock mechanism 58 to lock tube 28 into place. By reversing this operation, the stand can be changed from a boom stand to a vertical stand.

For the purposes of this patent application, the maximum angle between the two axis 18 and 54 is 90° (i.e. where arm 20 is perpendicular to column 12). When arm 20 is pivoted beyond 90°, the angle between the two axis is seen to decrease. The minimum angle between axis 18 and 54 is decreased by sloping face 44, because it permits arm 16 to be positioned as close to column 12 as possible.

Figure 5:
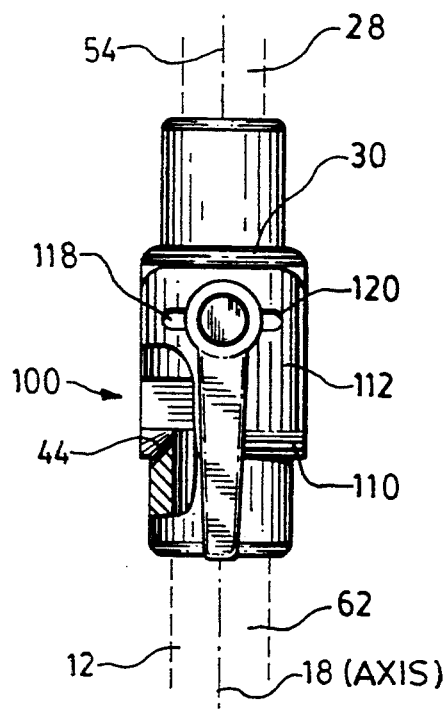
FIG. 5 is a side view of a potion of a second embodiment of the invention with the collar portion in its cental vertical position.
Figure 6:
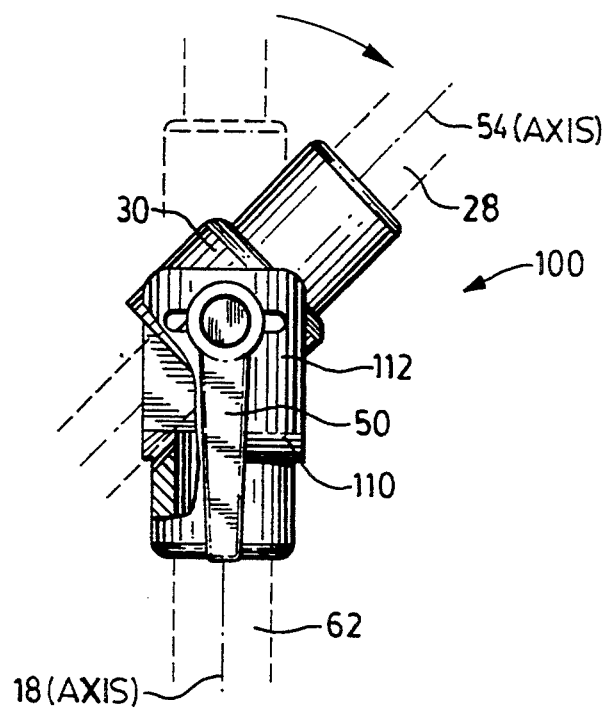
FIG. 6 is a side view of a portion of the second embodiment of the invention with the collar portion in its central tilted position.
Figure 7:
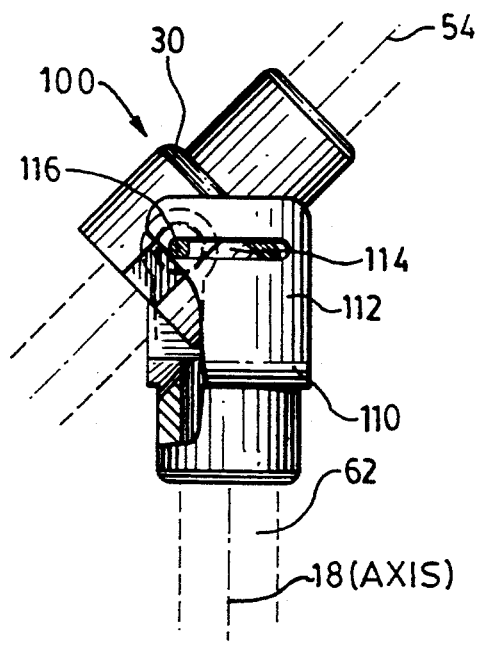
FIG. 7 is a side view of a portion of the second embodiment of the invention with the collar portion at an off-centre tilted position.
Figure 8:
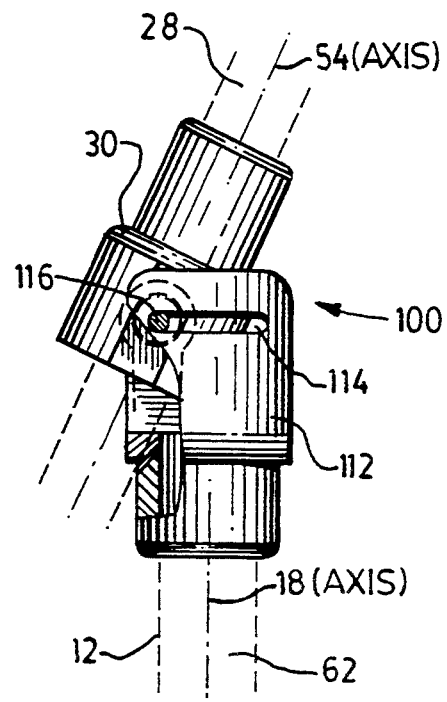
FIG. 8 is a side view of a portion of the second embodiment of the invention with the collar portion in an off-centre position and tilted at its smallest possible angle.

Stand 10 may comprise an alternate tilt mechanism 100 as shown in FIGS. 4 through 8. Tilt mechanism 100 includes a clevis 110 and a collar 30. As in the similar tilt mechanism 22, clevis 110 has a bottom tubular portion 34 having an opening 42 configured to allow tube 28 to pass snugly therethrough. Clevis 110 include brackets 112 which extend from bottom tubular portion 34 and are substantially parallel to axis 18 of column 12. Bottom tubular potion 34 is also provided with sloping face 44 which is at an angle to axis 18 of column 12. Brackets 112 are each provided with an elongated slot 114. Collar 30 is pivotally attached to brackets 112 by studs 116 which are attached on either side of collar 30 and which pass through slots 114. One of the studs is threaded and extends through slot 114, handle 33 of lock mechanism 32 being threaded onto the potion of the stud that extends past slot 114. Collar 30 can be laterally displaced from side to side along slots 114 from one end 118 of slot 114 to the other end 120 of slot 114. When collar 30 is positioned centrally between ends 118 and 120 of slot 114, the collar is pivotally movable relative to clevis 110 between a vertical position as shown in FIG. 5 wherein openings 42 and 52 are aligned and tube 28 can pass through sleeve 56 and through column 12, and a tilted position as shown in FIG. 6 wherein axis 54 of collar 30 is at an angle from axis 18 of column 12. As can be seen from FIG. 8, when collar 30 is moved such that studs 116 encounter one of the ends of slot 114, tube 28 can be positioned at a lower angle. As can be seen from FIG. 6, the minimal angle that tube 28 can be positioned relative to column 12 is approximately 45° when collar 30 is at a point midway between ends 118 and 120. As can be seen from FIG. 8, angles of about 25° can be obtained when collar 30 is laterally displaced. If brackets 112 are made sufficiently wide, slots 114 can be elongated and collar 30 can be displaced sufficiently to position tube 28 of arm 20 at angles of 10° or less from column 12.

While the convertible boom stand has been illustrated and described with respect to the preferred embodiments, it will be appreciated by those skilled in the art that numerous variations of these embodiments may be made without departing form the scope of the invention.

Therefore what is claimed is:

1. A convertible stand, comprising;
   (a) a tubular member having an open end and a longitudinal axis;
   (b) legs attached to the tubular member for supporting the tubular member;
   (c) an elongate arm configured to fit within the tubular member, the open end of the tubular member being dimensioned to permit the elongate arm to enter and exit the tubular member;
   (d) a tilt mechanism for connecting the elongate arm to the tubular member comprising a clevis attached adjacent to the open end of the tubular member and a collar pivotally attached to the clevis, the collar having a central opening for retaining the elongate arm therein, the collar pivotally movable between a vertical position wherein the opening of the collar and the open end of the tubular member are aligned and the elongate arm can pass into and out of the tubular member and a tilted position wherein the elongate arm is at an angle from the longitudinal axis of the tubular member, the clevis having a lock for releasably locking the collar relative to the clevis, and the collar having a lock for releasably locking the elongate arm in the collar, and
   (e) the clevis having a sloping face on a portion thereof adjacent to the open end of the tubular member, the sloping face positioned and configured to receive there against the elongate arm and position the elongate arm adjacent the tubular member when the collar is in its tilted position.

2. A convertible stand, comprising;
   (a) a tubular member having an open end portion and a longitudinal axis;
   (b) legs attached to the tubular member for supporting the tubular member;
   (c) an elongate arm configured to fit within the tubular member, the open end of the tubular member being dimensioned to permit the elongate arm to enter and exit the tubular member, and
   (d) a tilt mechanism for connecting the elongate arm to the tubular member comprising a clevis attached adjacent to the open end of the tubular member and a collar movably attached to the clevis, the collar having a central opening for retaining the elongate arm therein, the collar pivotally movable between a vertical position wherein the opening of the collar and the open end of the tubular member are aligned and the elongate arm can pass into and out of the tubular member and a tilted position wherein the elongate arm is at an angle from the axis of the tubular member, the collar laterally movable relative to the clevis between a central position wherein the collar can be pivoted to align the opening of the collar with the opening of the tubular member to a non-central position wherein the collar is spaced away from the longitudinal axis of the tubular member, the clevis having a lock for releasably locking the collar relative to the clevis, and the collar having a lock for releasably locking the elongate arm in the collar.

3. A convertible stand as defined in claim 2 wherein the clevis comprises a bottom portion and a pair of brackets, the bottom portion having an opening configured to permit the elongate arm to pass therethrough, the bottom portion attached to the open end of the tubular member, the brackets each having a longitudinal slot substantially perpendicular to the axis of the tubular member, the collar having a pair of projections, one projection on each side of the collar, the projections configured to engage the slots, the projections supporting the collar between the brackets.

4. A convertible stand as defined in claim 3 wherein the lock on the clevis locks the collar in position by forcing one of the brackets against the collar with sufficient force to hold the collar in place.

5. A convertible stand as defined in claim 4 wherein one of the slots is an elongated opening in the bracket, one of the projections is a threaded rod and projects through the elongated opening, a portion of the threaded rod extending beyond the bracket, and wherein the lock on the clevis comprises the threaded rod and a threaded handle threaded onto the portion of the threaded rod extending beyond the bracket.

6. A convertible stand as defined in claim 5 wherein the tubular member comprises a first hollow tube having an outside diameter and an inside diameter and a second tube having an inside diameter, the inside diameter of the first tube being dimensioned to permit the elongate arm to fit within the first tube, the inside diameter of the second tube being greater than the outside diameter of the first tube such that the first tube can fit within the second tube, the second tube having a locking mechanism for releasably locking the first tube in position relative to the second tube, the legs being attached to the second tube.

7. A convertible stand as defined in claim 6 wherein the elongate arm comprises a first tube having an outside diameter and a second tube having an outside diameter and an inside diameter, the outside diameter of the second tube of the elongate arm being less than the inside diameter of the first tube of the tubular member, the inside diameter of the second tube of the elongate arm being greater than the outside diameter of the first tube of the elongate arm such that the first tube of the elongate arm will fit within the second tube of the elongate arm, the second tube of the elongate arm having a locking mechanism for releasably locking the first tube of the elongate arm in position relative to the second tube of the elongate arm.

8. A convertible stand as defined in claim 7 wherein the legs are collapsible.

9. A convertible stand as defined in claim 3 wherein the bottom portion of the clevis has a sloping concave face dimensioned to receive the elongate arm and position the elongate arm adjacent the tubular member when the collar is in its tilted position.

10. A convertible stand as defined in claim 1 wherein the clevis comprises a bottom portion and a pair of brackets, the bottom portion having an opening configured to permit the elongate arm to pass therethrough, the bottom portion attached to the open end of the tubular member, the brackets each having an opening, the collar having a pair of projections, one projection on each side of the collar, the projections configured to engage the openings, the projections supporting the collar between the brackets.

11. A convertible stand as defined in claim 10 wherein the lock on the clevis locks the collar in position by forcing one of the brackets against the collar with sufficient force to hold the collar in place.

12. A convertible stand as defined in claim 11 wherein one of the projections is a threaded rod and projects through the opening in one of the brackets, a portion of the threaded rod extending beyond the bracket, and wherein the lock on the clevis comprises the threaded rod and a threaded handle threaded onto the portion of the threaded rod extending beyond the bracket.

13. A convertible stand as defined in claim 12 wherein the tubular member comprises a first hollow tube having an outside diameter and an inside diameter and a second tube having an inside diameter, the inside diameter of the first tube being dimensioned to permit the elongate arm to fit within the first tube, the inside diameter of the second tube being greater than the outside diameter of the first tube such that the first tube can fit within the second tube, the second tube having a locking mechanism for releasably locking the first tube in position relative to the second tube, the legs being attached to the second tube.

14. A convertible stand as defined in claim 13 wherein the elongate arm comprises a first tube having an outside diameter and a second tube having an outside diameter and an inside diameter, the outside diameter of the second tube of the elongate arm being less than the inside diameter of the first tube of the tubular member, the inside diameter of the second tube of the elongate arm being greater than the outside diameter of the first tube of the elongate arm such that the first tube of the elongate arm will fit within the second tube of the elongate arm, the second tube of the elongate arm having a locking mechanism for releasably locking the first tube of the elongate arm in position relative to the second tube of the elongate arm.

15. A convertible stand as defined in claim 14 wherein the legs are collapsible.

* * * * *